US012460864B2

(12) United States Patent
Alves-Filho et al.

(10) Patent No.: US 12,460,864 B2
(45) Date of Patent: Nov. 4, 2025

(54) MODULAR SYSTEM AND PROCESS OF DRYING SOLIDS AND LIQUID-SOLID MIXTURES

(71) Applicant: Waister AS, Sem (NO)

(72) Inventors: Odilio Alves-Filho, Trondheim (NO); Jarl Spandow, Snarøya (NO)

(73) Assignee: Waister AS, Sem (NO)

( * ) Notice: Subject to any disclaimer, the term of this patent is extended or adjusted under 35 U.S.C. 154(b) by 843 days.

(21) Appl. No.: 16/960,951

(22) PCT Filed: Jan. 16, 2019

(86) PCT No.: PCT/NO2019/050007
§ 371 (c)(1),
(2) Date: Jul. 9, 2020

(87) PCT Pub. No.: WO2019/143254
PCT Pub. Date: Jul. 25, 2019

(65) Prior Publication Data
US 2020/0348078 A1    Nov. 5, 2020

(30) Foreign Application Priority Data

Jan. 16, 2018 (NO) .................................. 20180066

(51) Int. Cl.
*F26B 21/08* (2006.01)
*B01D 5/00* (2006.01)
(Continued)

(52) U.S. Cl.
CPC .......... *F26B 21/086* (2013.01); *B01D 5/0072* (2013.01); *B01D 45/16* (2013.01);
(Continued)

(58) Field of Classification Search
CPC ...... F26B 21/086; F26B 17/04; F26B 17/102; F26B 2200/18; F26B 3/0923; F26B 11/16;
(Continued)

(56) References Cited

U.S. PATENT DOCUMENTS

2007/0068033 A1* 3/2007 Cerea ..................... F26B 25/009
34/368
2012/0030962 A1   2/2012 Nandi et al.
2014/0131903 A1   5/2014 Youn

FOREIGN PATENT DOCUMENTS

CN    203758201 U    8/2014
CN    104034128 A    9/2014
(Continued)

OTHER PUBLICATIONS

Translation, WO-2017034132-A1, Mar. 2017 (Year: 2017).*
(Continued)

*Primary Examiner* — Jessica Yuen
(74) *Attorney, Agent, or Firm* — Alix, Yale & Ristas, LLP

(57) ABSTRACT

Modular system of drying humid material, comprising a drier housing having a material inlet and outlet, a drying gas inlet and outlet, a particle separator downstream of drier housing. Drier housing comprises drying chambers. The system further comprises an air fan, and a heater. A gas duct connecting drying gas inlet and drying gas outlet defines a closed loop. A condenser is arranged in gas duct. Drying chambers comprises a rotary impeller means, and drying gas inlets. A dried-hot product cooler comprising a housing having a dried-hot product inlet, a cooled dried product outlet, a cool air supply means, and a fan arranged to draw cooled air through dried hot product in cooler.

20 Claims, 5 Drawing Sheets

(51) Int. Cl.
    *B01D 45/16*     (2006.01)
    *B01D 46/02*     (2006.01)
    *B01D 50/20*     (2022.01)
    *C02F 11/13*     (2019.01)
    *C02F 103/20*     (2006.01)
    *C02F 103/32*     (2006.01)
    *F26B 17/04*     (2006.01)

(52) U.S. Cl.
    CPC .............. *B01D 46/02* (2013.01); *B01D 50/20* (2022.01); *C02F 11/13* (2019.01); *F26B 17/04* (2013.01); *C02F 2103/20* (2013.01); *C02F 2103/32* (2013.01); *F26B 2200/18* (2013.01)

(58) Field of Classification Search
    CPC .... F26B 21/04; F26B 2200/02; B01D 5/0072; B01D 45/16; B01D 46/02; B01D 50/20; C02F 11/13; C02F 2103/20; C02F 2103/32; C02F 11/16; C02F 11/18; C02F 11/12

See application file for complete search history.

(56) References Cited

FOREIGN PATENT DOCUMENTS

| | | | |
|---|---|---|---|
| CN | 106352691 A | 1/2017 | |
| DE | 19548494 C1 * | 7/1997 | .............. C02F 11/12 |
| EP | 0410043 B1 * | 1/1991 | |
| EP | 3124682 A1 | 2/2017 | |
| GB | 2158222 A | 11/1985 | |
| JP | 5266544 B2 | 8/2013 | |
| NO | 20130716 A1 | 11/2014 | |
| WO | WO-2007124745 A1 * | 11/2007 | ................ B01J 2/16 |
| WO | WO-2017034132 A1 * | 3/2017 | ........... A23B 7/0205 |

OTHER PUBLICATIONS

Translation, DE-19548494-C1, Jul. 1997 (Year: 1997).*
Alves-Filho, Odilio "Heat Pump Dryers. Theory, Design and Industrial Applications," Chapter 6, p. 173-188, CRC Press, Taylor & Francis Group, 2016.
Law, C.L. and Mujumdar, Arun S. "Handbook of Industrial Drying," Chapter 8.8, p. 188-193, RC Press, Taylor & Francis Group, 2007.
International Search Report and Written Opinion mailed Apr. 8, 2019 (PCT/NO2019/050007).

* cited by examiner

MODULAR SYSTEM AND PROCESS OF DRYING SOLIDS AND LIQUID-SOLID MIXTURES

BACKGROUND

The disclosed embodiments relate to a modular system and method of drying solid materials and liquid-solid mixtures.

The inventive embodiments relate to general drying, transformation and recovery of waste from fisheries, aquaculture and disposed foods as well as sludge, biodegradables and by-products. Solid and semi-solids materials can be pre-formed in suitable shapes for drying such as particulates, granulates or agglomerates to be properly dried. Additionally, the dryer processes Newtonian or non-Newtonian fluid-solid mixtures as they can be blended, cut, granulated or agglomerated prior to drying. In particular, the disclosed embodiments apply to industrial drying of distiller's byproducts and residues such as wet distillers wet spent grains.

There are many dryers around the world and special dryers as fully described on "Heat Pump Dryers—Theory, Design and Industrial Applications" with ISBN 13-978-1-4987-1133-3, written by Odilio Alves-Filho, 2016 CRC Press, NY, 2016.

However, prior art dryers of this type of material and liquid-solid mixture are difficult to handle or operate, due to clogging, lumping and drying disturbances leading to frequent shut-downs. There is also a need for a more energy efficient drying process.

SUMMARY

Provided herein is a system of recycling wet solid or semi-solid waste, and convert it to useful products. Also provided is a drying process for waste that eliminates dust pollution to the atmosphere. Also provided is a drying process with enhanced energy efficiency.

The disclosed embodiments concern a modular system of drying solid material, including waste from fisheries, aquaculture, breweries and disposed food, said system comprising a drier housing having a material inlet, a material outlet, a drying gas inlet, a drying gas outlet, a particle filter arranged at the drying gas outlet, said drier housing further comprising at least one drying chamber. The modular system further comprises a fan for blowing air into the drier housing, and a heater for heating drying air before entering the drier housing.

The modular system exhibits a closed loop gas duct connecting the drying gas inlet and drying gas outlet, and a condenser arranged in the gas duct. A bypass duct with a bypass valve means is connected to the gas duct upstream and downstream of the heat exchanger. A relief valve bleeder is arranged in the gas duct downstream of the condenser to remove vapour and non-condensable gases from the drying loop. The valve can be time- or electric-magnetic-controlled or hydraulically controlled. The drying chambers further comprises a rotary impeller and dis-integrator means at the bottom of the drier housing, and one or more drying gas inlets in the side wall of the drying chambers and near the bottom of the same, arranged to inject drying gas in a direction substantially horizontally into the drying chambers (100, 108', 108").

Preferably, a secondary filter is arranged in the duct upstream of the heat exchanger to collect particles down to 30 microns or smaller.

The filter is preferably a quick-release box filter, arranged to pull out spent filter and insert new filter in a quick and simple manner, during or after drying operation.

A honeycomb structure is advantageously arranged upstream of the heater, wherein the honeycomb structure exhibits numerous adjacent flow channels, arranged with the longitudinal axis substantially aligned with the flow direction in duct, arranged to make the air flow to the heater more homogenous and non-wavy near the wall.

The heat exchanger comprises, in a traditional manner, a housing accommodating numerous lamellas and fins interconnected by cooling liquid pipes. In a particularly preferred embodiment, the heat exchanger further comprises numerous baffle plates, arranged with one side or end thereof attached to the internal wall of the housing and the opposite side or end terminated at a distance from the internal wall of the housing, wherein adjacent baffle plates are arranged with their free end in an alternating manner, thus forming a wave-shaped gas flow path through the condenser. This arrangement extends the flow path, enhances condensation and improves the condenser efficiency. In a preferred embodiment, the heat exchanger comprises two or more gas inlets and outlets and two or more cooling fluid inlets and outlets.

In another aspect, a method of operating the system described above comprises the steps of:
feeding wet solid material to drying chamber,
feeding dry gas having a temperature of about 70-140° C. to the drying chamber in a horizontal direction,
operating the impellers or dis-integrators, which together with air flow maintains a fluidized bed of solid material or solids and liquid mixture being dried,
discharging dried material at product outlet,
separating particles from spent drying gas in a particle separator means,
discharging filtered spent drying gas in gas outlet,
optionally filtering the drying gas in a secondary box filter to remove fines therefrom,
removing liquid from the drying gas in the condenser, or bypassing drying gas in bypass duct in cases where the drying gas has a low content of humidity or humidity needs to be adjusted,
removing vapour and non-condensable gases from the drying loop through a time-controlled, electrically controlled or hydraulically controlled relief valve bleeder,
guiding the drying gas through the honeycomb structure to provide a homogenous ideal non-wavy gas flow near the wall,
heating the homogenous ideal non-wavy gas flow in the heater to a temperature of about 70-140° C., and
returning hot drying gas to the drying chamber.

BRIEF DESCRIPTION OF THE DRAWINGS

The invention is now explained in further details by means of drawings, where.

DETAILED DESCRIPTION

Initially it should be mentioned that instrumentation, such as temperature gauges, pressure gauges, humidity gauges, flow meters and controller have been omitted for the case of simplicity. However, the person skilled in the art would be in a position of including the instrumentation and controllers necessary to operate the process.

Figure 1A:
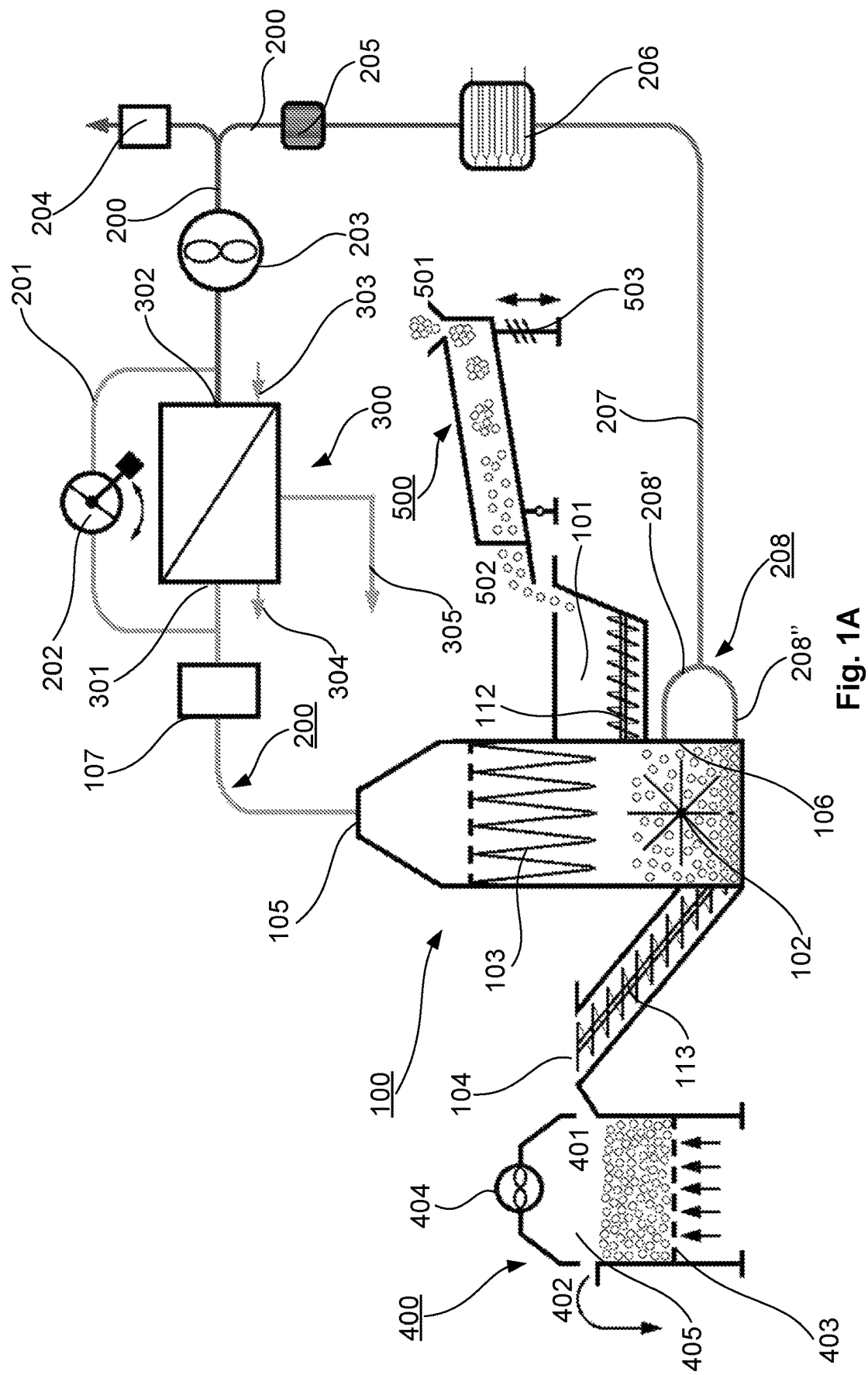
FIG. 1A is a schematic flow diagram illustrating a first embodiment of the disclosed drying process.
Figure 1B:
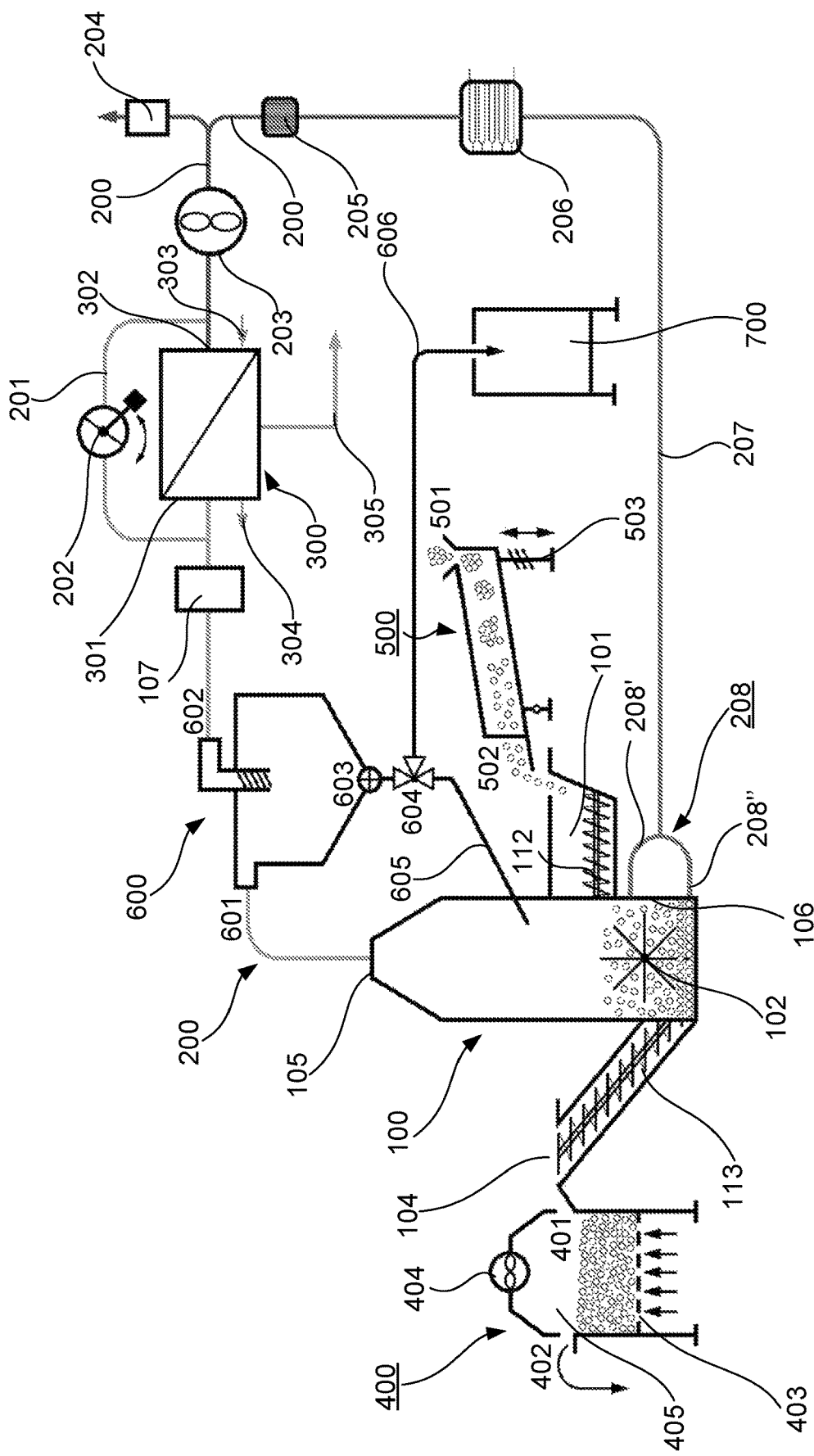
FIG. 1B is a schematic flow diagram of a second embodiment of the drying process.

Now referring to FIG. 1A, a simplified flow sheet a first embodiment of the disclosed system is shown. A dryer chamber housing is indicated by reference numeral 100, having an inlet 101 for waste material with a hopper which feeds a screw conveyor 112 that is time- and flow-controlled to operate in semi-continuous or continuous mode. In a preferred embodiment, a feeder hopper 500 is arranged upstream of the drier chamber housing inlet 101, having an inlet 501, an outlet 502 in flow communication with the dryer housing inlet 101. The feeder hopper is kept in motion by an oscillator 503 to provide an initial de-clogging of the wet material to be dried. In FIGS. 1A and 1B, the feeder hopper 500 is illustrated as an elongate rectangular duct, inclined in a direction downward in flow direction toward the outlet 502, and with an oscillator means arranged at the inlet end 501 to oscillate the feeder hopper 500 up and down urging the wet material toward the outlet 502 and de-bridging possibly agglomerated feed.

A rotary impeller 102 is arranged at the bottom of the drying chamber housing 100, which serves to disaggregate and circulate the waste material and, in combination with air flow, establishing a fluidized bed at the bottom of the drying chamber housing 100. A particle separator, here provided in the form of a main filter 103, arranged in the upper part of the drying, covering the cross-section of the dryer housing 100. A product outlet 104 is arranged at the bottom of the drying chamber housing 100, e.g. a screw conveyor 113, which is controlled to semi-continuously or continuously discharge dried material. A product cooler arranged downstream of the product outlet 104 is indicated by reference numeral 400, having an inlet 401 connected with a drying chamber and an outlet 402 for cooled product discharge. A grid 403 is arranged inside the drying chamber, supplied with cold air to cool dried-hot product located inside the cooling chamber. Moreover, a fan 404 is arranged to draw cooled air into grid 403 and through product in the cooler housing 405. Then, the fan 404 blows the warmer exiting air through the inlet feed that is pre-heated and energy is recovered.

The product cooler 400 is advantageously kept in motion by an oscillator (not shown). The dryer housing 100 further comprises a gas outlet 105 connected with gas duct 200. A box filter 107 (FIG. 4) is arranged in gas duct 200, to remove and collect very fine particles down to 30 microns or smaller. The filter is described in more details below.

A condenser 300 is arranged downstream of the box filter 107, to condense vapour and remove liquid in air exhausted from the dryer chamber housing 100. Cooling water, at a temperature at least 5° C. lower than the dew point of the incoming condensing air stream, enters the condenser 300 at cooling water inlet 303, absorbs energy and increases its enthalpy and leaves the condenser 300 at cooling water outlet 304. Condensed liquid is drained at condense outlet 305 and from which the condensate energy can be recovered to preheat the material, screw conveyors or dis-integrator. A bypass duct 201 is arranged in the gas duct 200, connecting the gas inlet 301 and gas outlet 302 of the condenser 300. A bypass valve means 202 is arranged in the bypass duct 201, e.g. a flap or baffle valve, for partial control of flow, humidity and quality. The flap valve is opened in cases where the gas flow contains little humidity, as to control humidity and dry air mixture ratio and thus saving energy in the process.

In a second embodiment, illustrated in FIG. 1B, the main filter 103 has been replaced by a cyclone 600 having an inlet 601 for dust-containing air in flow connection with gas duct 200 and outlet 105 of the dryer housing. The cyclone further exhibits a solids outlet 603 in the bottom of the cyclone housing in flow connection with a three-way valve 604 further connected to a recycle duct 605 for recycling fines back to drying chamber housing 100, and a fines duct 606 connected to a dry fines container 700. Substantially clean air is ejected from the cyclone 600 through clean air outlet 602 downstream of the box filter 107. The second embodiment with a dust collector in the form of one or more cyclones is preferred to the main filter embodiment because the cyclone is practically maintenance-free, contrary to dust filter which needs maintenance and replacement. The cyclone embodiment also has the advantages that the process can be operated fully continuously. Moreover, the cyclone embodiments operates at lower pressure drop, thus reducing the operating costs of the system.

A fan 203 is arranged in the gas duct, in this embodiment downstream of condenser 300. A time-controlled, electrically controlled or hydraulically controlled relief valve bleeder 204 is arranged in duct 200 downstream of fan 203, controlled by a pressure gauge and temperature gauge. In this way the excess vapour and non-condensable gases are removed from the drying loop.

The duct further comprises a honeycomb structure 205 (FIG. 5), exhibiting numerous adjacent flow channels, arranged with the longitudinal axis substantially aligned with the flow direction in duct 200 and upstream of a heater 206. The honeycomb structure 205 serves to make the air flow uniform and the air heating in heater 206 becomes more efficient.

Moreover, the heater 206 preferably comprises numerous elongate heating elements, extending with their longitudinal axis substantially perpendicular to the flow direction. The heater is composed of set of elements that are connected in parallel to each other as to release energy either to heating the material, heating the metal components and for moisture evaporation, or individually such as only for moisture evaporation. The heater is preferably operated by electricity, but it can also use steam recovered from other processes, such as discharge from turbines or from evaporation systems. The heater supplies energy to increase the air-steam temperature to the required 70-140° C. at the inlet of dryer housing 100.

The gas duct 207 is downstream of heater 206 in a gas manifold 208 split into a first gas return duct 208' and second gas return duct 208" and connected with gas return inlet 106 in dryer 100, as explained in further details immediately below.

Figure 2A:
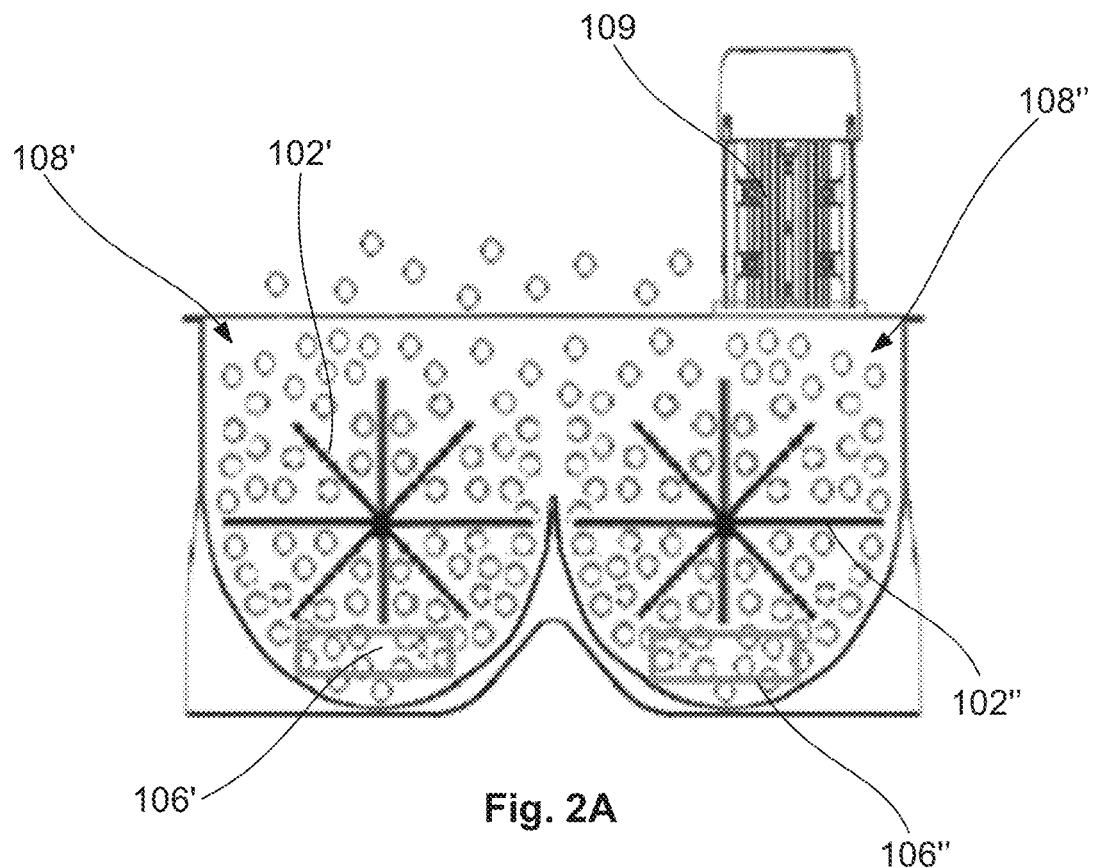
FIG. 2A is a schematic cross-section through the dis-aggregator in the drying chamber.

FIG. 2A illustrates a vertical cross-section of a part of the dryer, in this embodiment, comprising a first and second drying chambers 108' and 108", provided with first and second impeller 102' and 102", respectively. An electric motor 109 is arranged at the drying chambers to operate the impellers 102' and 102". Recycled air is injected into the drying chambers 108' and 108" through a first and second recycle gas inlet 106' and 106", respectively. The gas inlets 106' and 106" are arranged in a side wall of the respective drying chambers 108' and 108", arranged to inject drying air in a direction substantially horizontally into the respective drying chambers 108' and 108". This horizontal injection of drying air provides, together with impeller 102, formation and maintenance of a fluidized bed in an efficient manner, enhancing heat transfer and moisture removal capacity.

Figure 2B:
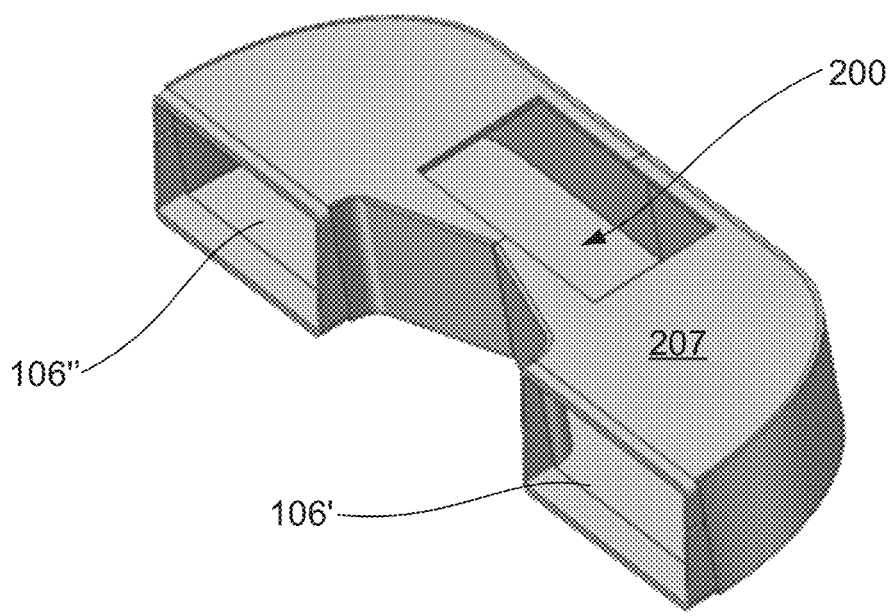
FIG. 2B is a perspective view of the air supply device to the drying chamber.

FIG. 2B illustrates a recycle gas inlets 106' and 106" in the form of a recycle gas manifold 208 mentioned above in perspective, arranged to connect to an end of gas duct 207 and to first and second recycle gas inlet 208' and 208".

Figure 3A:
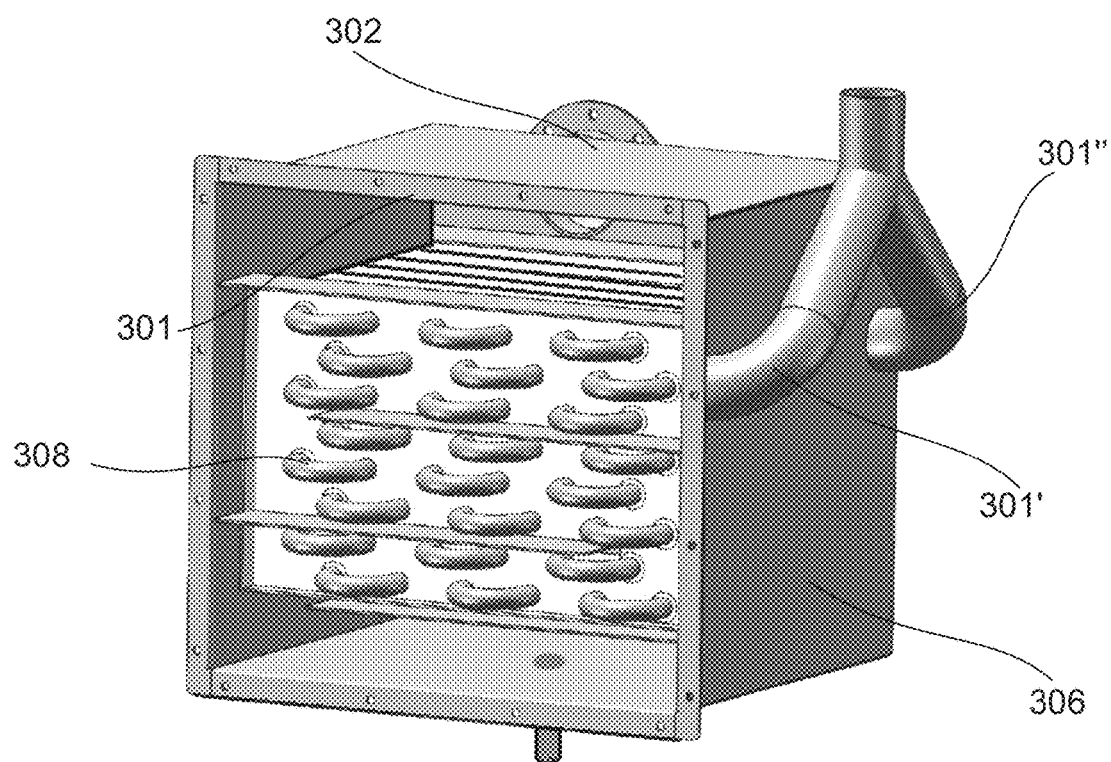
FIGS. 3A and 3B are perspective view through the condenser.
Figure 3B:
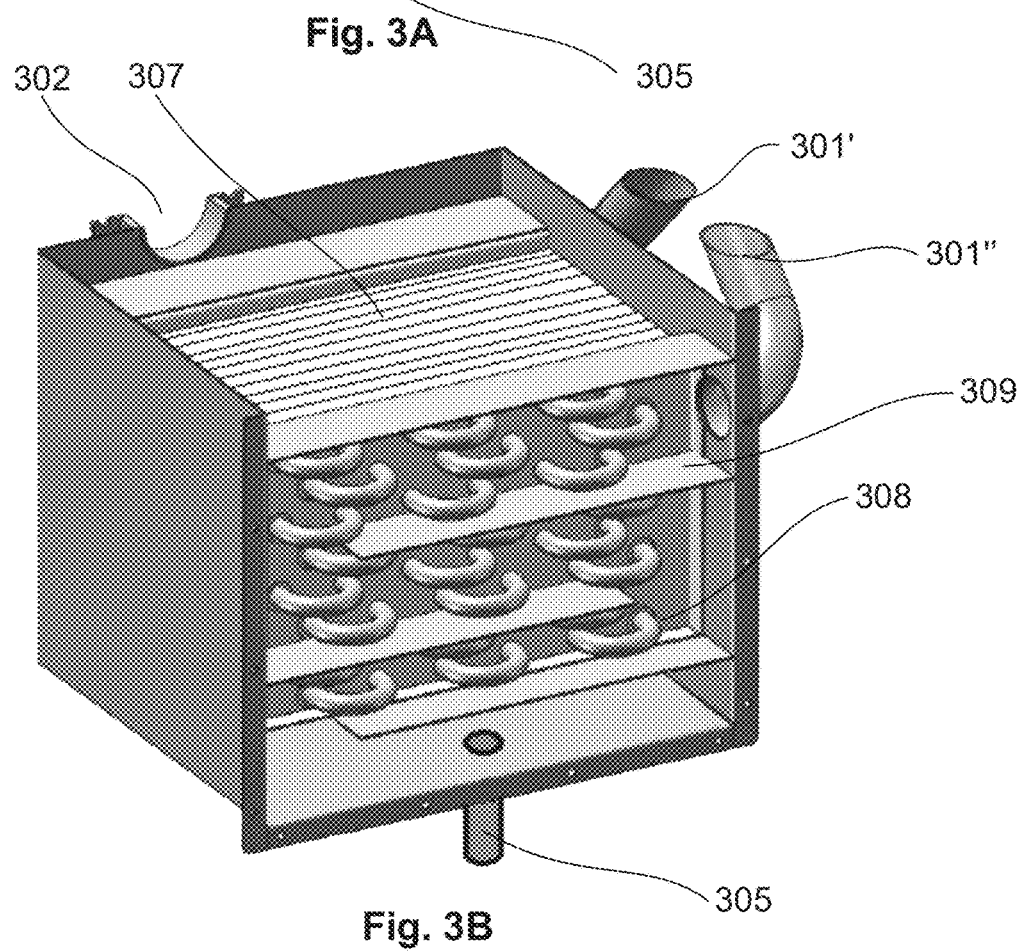

Now referring to FIGS. 3A and 3B, the condenser 300 is shown in perspective in a partial cut-out, comprising a housing 306 with a first and second gas inlet 301' and 301", respectively, and a gas outlet 302. Numerous lamellas and fins 307 are arranged in a traditional manner, provided with pipes 308 for cooling liquid. Numerous baffle plates 309 are arranged with one side or end attached to the internal wall of the housing 306 and the opposite side or end ("free end") terminated at a distance from the internal wall of the housing 306. Adjacent baffle plates, arranged at a distance therefrom, are arranged with their free end in an alternating manner, thus forming a wave-shaped gas flow path through the condenser 300. This arrangement with several gas inlets 301' and 301" and baffled gas flow path by the baffle plates 309 provides a more efficient heat transfer and higher condensation than a traditional condenser with one single gas inlet and without baffle plates. Accordingly, the condenser can be built with smaller dimensions than prior art condensers.

Figure 4:
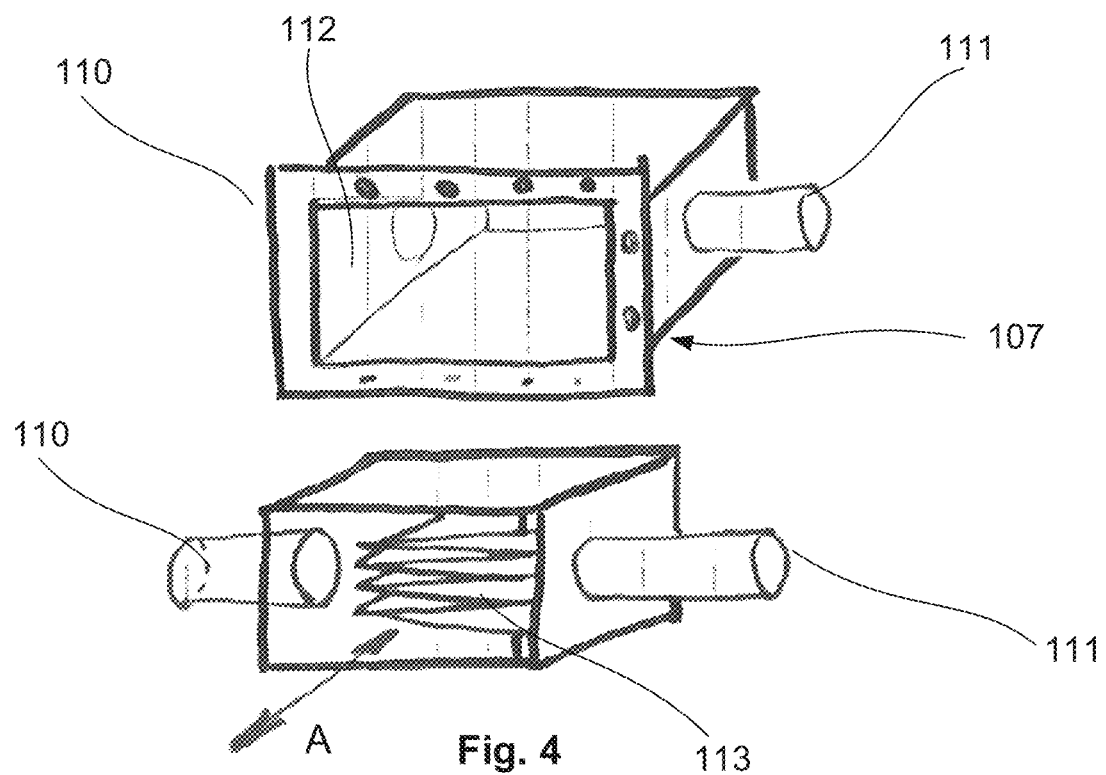
FIG. 4 is a perspective view of the box filter for removing fines.

FIG. 4 illustrates the box filter 107 comprising a box housing with a gas inlet 110 and gas outlet 111, and a frontal opening to accommodate an access window. A bag filter 113 is arranged slidably (arrow) inside the box filter housing 110 for easy and quick exchange by a new filter when it has reached its service life. The window is sealed, has an opening handle and 120° angular rotation provided by two barrel hinges.

Figure 5:
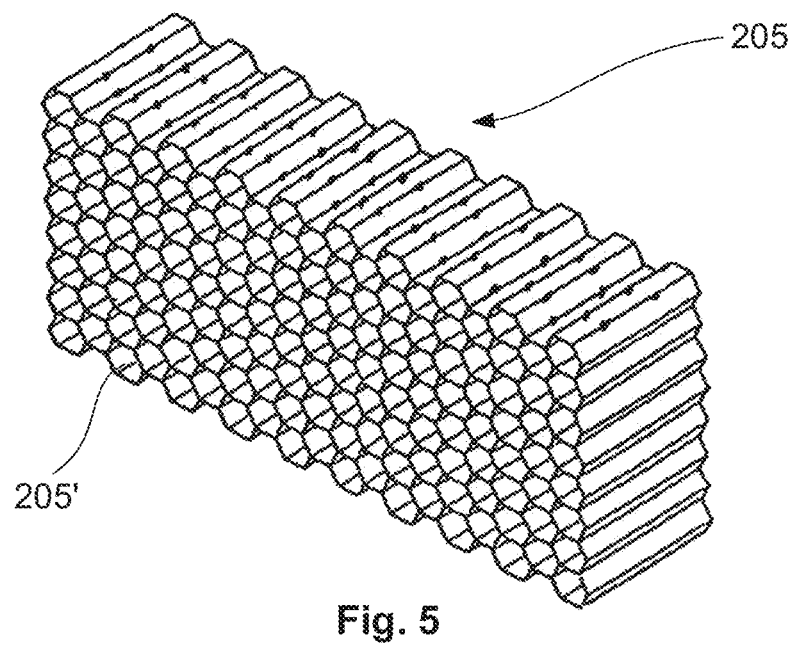
FIG. 5 is a perspective view of the honeycomb device for straightening air flow to a heater.

Finally, FIG. 5 illustrates the honeycomb device, comprising numerous elongate cells 205' with open ends and arranged adjacent to another in a housing (not shown) having a gas inlet and gas outlet. The honeycomb device is arranged with the elongate cells with their longitudinal axis extending in line with the flow direction in duct 200. As mentioned above, the honeycomb device is useful for providing a more efficient heating in the heater 206 because the gas flow becomes more uniform across the tube section, more stable and less wavy near the heater's wall.

Mode of Operation

The principle of operation and method is explained by considering FIGS. 1 and 2. The air enters the dryer housing 100 and suspends the wet material together with the rotating action of the dis-aggregator or impeller 102. The material is contained in a hopper and is continuously or semi-continuously loaded by a flow and time controlled horizontal screw-conveyor 112 in the drying chamber 100, 108', 108". The dried product is unloaded by an inclined a flow controlled screw-conveyor 113. As the suspended or fluidized material is heated by the air, it is being dried, and vapor or moisture is transported by the flowing air, crossing the main filter 103 that collects small dried particles. After flowing through a smooth 90° bend, the air passes the quick-release box filter that collects and traps the remaining very fine particles, avoiding their further transport to the next process components. At this stage there are two ways for the air to flow, which allows adjustment of the temperature, relative humidity and quality of an air-steam. In the normal way, the air-steam flows through the condenser 300 where the vapor changes phase to liquid and is drained out of the drying loop in duct 200 at condenser outlet 305, from which energy is recovered to pre-heat the incoming material. In the other way air bypasses the condenser and flows through the flap or baffle valve 202. To perform this task, the condenser's fins or lamellas and stainless steel tube surface temperature is kept below the dew-point temperature of the incoming air-steam mixture. Then, the air enters the suction side of the fan 203 that provides the required volumetric and mass flow rates and pressure difference. The air enters a smooth bend where it flows in one of two directions. One direction is toward the time-controlled relief valve 204 and to a water lock (not shown). In this way the vapor and non-condensable gases are removed from the drying loop. Another direction is toward the honeycomb device 205, which is the normal flow of air. The honeycomb device provides uniform air-steam flow prior to enter the heater 206, which releases the exactly amount of energy as required to heat the mixture to the set conditions required for drying, that is, temperature, quality or relative humidity. Then, the air flows through a smooth bend and to the downcomer 208, whereupon it enters the curved two-expansions manifold 208, 208' and 208". Finally, the air enters the drying chamber 108', 108" to dry the suspended material and transport the removed vapor, thus repeating the cycle.

The process can be operated in numerous manners, e.g. batchwise, continuously or semi-continuously. These modes of operation are possible because the screw conveyor 112 is time and flow controlled to feed the material batchwise, semi-continuously or continuously into the drying chamber.

Technical Effects

The drying chambers with horizontal air injection combined with one or more rotary impellers serving as grinder, dis-integrator, circulators and mixer, ensure that the material to be dried is kept suspended, disaggregated or dispersed for proper drying. As a result, a large material surface for drying is obtained. Moreover, sticky material is prevented from clogging or blocking the air flow while keeping a stable suspended bed of material. This is a favourable procedure because drying with suspended bed reduces energy use, residence time and pressure loss.

The bypass duct around the condenser reduces energy consumption when the air from the dryer contains little humidity while adjusting the dry air and vapour ratio.

The condenser itself with numerous condensing gas inlets and staggered baffle plates increases the condenser efficiency and condensation capacity and allows for a more compact design or higher cooling effect compared to prior art condensers.

The honeycomb device provides uniform, stable and non-wavy air flow prior to enter the heater, which releases the exactly amount of energy as required to heat the mixture to the set conditions required for drying, that is, temperature, quality or relative humidity.

While the inventive embodiments have been described using air as drying medium, the process can be operated by steam as drying medium as well. In that case, the process will exhibit a slightly different design with similar layout of components. Alternatively, the process can be operated by applying heat pump with fluids with zero global warming potential and zero ozone depletion potential. The dryer housing has been illustrated with one or two drying chambers, but the inventive embodiments can comprise three or more drying chambers and a hot product cooling chamber. The dryer is modular and can accommodate double, triple or quadruple sized drying chambers for multiple capacity or volume of material to be dried. The secondary filter 107 is not required, but is recommended in order to keep fouling at a low level and prevent clogging or blocking airflow in downstream components.

The invention claimed is:

1. A modular system for drying solid materials and liquid-solid mixtures, comprising:
   a drier housing (100) having a material inlet (101), a material outlet (104), one or more drying gas inlets (106), a drying gas outlet (105) and at least one drying chamber (108', 108"),
   a particle separator positioned downstream of the at least one drying chamber (108', 108"),
   a fan (203) configured to blow drying air into the drier housing (100), and
   a heater (206) for heating drying air prior to entering the drier housing (100), wherein the system further comprises
   a closed loop gas duct (200) connecting the drying gas inlet (106) and drying gas outlet (105),
   a condenser (300) positioned in the gas duct (200),
   a bypass duct (201) with a bypass valve (202) connected to the gas duct (200) upstream and downstream of the condenser (300) to optionally allow flow through the gas duct (200) to bypass of the condenser (300),
   a time- or electric-magnetic-controlled relief valve bleeder (204) positioned in gas duct (200) to remove vapor and non-condensable gases from the drying loop, wherein
   the at least one drying chamber (108', 108") further comprises a rotary impeller and dis-integrator (102) proximate the bottom of the drier housing (100), and the one or more drying gas inlets (106', 106") in the side wall proximate the bottom of the at least one drying chamber (108', 108") configured to inject drying gas in a substantially horizontal direction into the at least one drying chamber (108', 108").

2. The modular system of claim 1, wherein a filter (107) is arranged in the duct (200) upstream of the condenser (300) to collect particles.

3. The modular system of claim 2, wherein the filter (107) is configured to collect particles having a size of 30 microns or smaller.

4. The modular system of claim 2, wherein the filter (107) is a quick-release box filter positioned for removal and replacement during or after a drying operation.

5. The modular system of claim 2, comprising a honeycomb structure (205) having numerous adjacent flow channels extending in a longitudinal direction positioned upstream of the heater (206), said honeycomb structure (205) positioned with the longitudinal axes of the channels substantially aligned with a flow direction in the duct (200) thereby causing air flow to the heater (206) to increase in homogeneity and decrease in waviness near a wall defining the duct (200).

6. The modular system of claim 2, wherein the condenser (300) comprises
   a housing (306) defining an inner wall with at least a pair of opposite sides and accommodating numerous fins and lamellas (307) interconnected by cooling liquid pipes (308),
   numerous baffle plates (309) each having one side or an end thereof attached to the internal wall of the housing (306) and an opposite side or end terminated at a distance from one of the pair of sides of the inner wall thereby defining a free end of the respective baffle plate, wherein
   adjacent baffle plates are arranged with the position of their respective free ends in an alternating between the pair of opposite sides.

7. The modular system of claim 2, comprising a dried-hot material cooler (400) positioned downstream of the material outlet (104), the dried-hot material cooler (400) having a housing (405) with a dried-hot material inlet (401), a cooled dried material outlet (402), a cool air supply (403), and a fan (404) arranged to draw cooled air through the dried material cooler (400).

8. The modular system of claim 1, comprising a honeycomb structure (205) having numerous adjacent flow channels extending in a longitudinal direction positioned upstream of the heater (206), said honeycomb structure (205) positioned with the longitudinal axes of the channels substantially aligned with a flow direction in the duct (200) thereby causing air flow to the heater (206) to increase in homogeneity and decrease in waviness near a wall defining the duct (200).

9. The modular system of claim 8, wherein the condenser (300) comprises
   a housing (306) defining an inner wall with at least a pair of opposite sides and accommodating numerous fins and lamellas (307) interconnected by cooling liquid pipes (308),
   numerous baffle plates (309) each having one side or an end thereof attached to the internal wall of the housing (306) and an opposite side or end terminated at a distance from one of the pair of sides of the inner wall thereby defining a free end of the respective baffle plate, wherein
   adjacent baffle plates are arranged with the position of their respective free ends in an alternating between the pair of opposite sides.

10. The modular system of claim 8, wherein the particle separator is a cyclone (600), with an inlet (601) in flow connection with the gas outlet (105) of the dryer housing (100), and a clean air outlet (602) in flow connection with a filter (107), said cyclone (600) further including a particle outlet (603) and a three-way valve (604) connected to a recycle duct (605) and a dry fines container (700) via fines duct (606).

11. The modular system of claim 8, comprising a dried-hot material cooler (400) positioned downstream of the material outlet (104), the dried-hot material cooler (400) having a housing (405) with a dried-hot material inlet (401), a cooled dried material outlet (402), a cool air supply (403), and a fan (404) arranged to draw cooled air through the dried material cooler (400).

12. The modular system of claim 1, wherein the condenser (300) comprises
   a housing (306) defining an inner wall with at least a pair of opposite sides and accommodating numerous fins and lamellas (307) interconnected by cooling liquid pipes (308),
   numerous baffle plates (309) each having one side or an end thereof attached to the internal wall of the housing (306) and an opposite side or end terminated at a distance from one of the pair of sides of the inner wall thereby defining a free end of the respective baffle plate, wherein
   adjacent baffle plates are arranged with the position of their respective free ends in an alternating between the pair of opposite sides.

13. The modular system of claim 1, wherein the condenser (300) comprises two or more gas inlets and outlets (301', 301", 302) and two cooling media inlets and outlets (303, 304).

14. The modular system of claim 1, wherein the particle separator is a cyclone (600), with an inlet (601) in flow connection with the gas outlet (105) of the dryer housing (100), and a clean air outlet (602) in flow connection with a filter (107), said cyclone (600) further including a particle outlet (603) and a three-way valve (604) connected to a recycle duct (605) and a dry fines container (700) via fines duct (606).

15. The modular system of claim 1, wherein the particle separator is a primary dust filter (103) arranged inside the dryer housing (100).

16. The modular system of claim 1, comprising a feeder hopper (500) having an inlet (501) and an outlet (502) is arranged to deliver wet material to the material inlet (101), said feeder hopper (500) being inclined downward in a flow direction of the wet material and including an oscillator (503) at the inlet (501) configured to vibrate the feeder hopper (500).

17. The modular system of claim 1, comprising a dried-hot material cooler (400) positioned downstream of the material outlet (104), the dried-hot material cooler (400) having a housing (405) with a dried-hot material inlet (401), a cooled dried material outlet (402), a cool air supply (403), and a fan (404) arranged to draw cooled air through the dried material cooler (400).

18. The modular system of claim 17, wherein the dried-hot material cooler comprises a grid (403) surface at a bottom of the housing (104) to support dried material inside the housing (104) and let cooled air to flow into the housing (104) from a cooled air source.

19. A method of operating the system of claim 1, comprising the steps of:

(a) feeding wet solid material to the at least one drying chamber (108', 108") via a screw conveyor (112) batch-wise, continuously or semi-continuously,
(b) feeding drying gas having a temperature within an approximate range of 70° C.-140° C. to the drying chamber (108', 108") in a substantially horizontal direction,
(c) operating impellers or dis-integrators (102) within the at least one drying chamber (108', 108") to maintain a fluidized bed of solid material or liquid-solid mixture being dried,
(d) discharging dried material from the material outlet (104),
(e) separating particles from spent drying gas in the particle separator (103; 600),
(f) discharging filtered spent drying gas from the drying gas outlet (105),
(g) optionally filtering drying gas in a box filter (107) to remove fines therefrom,
(h) removing liquid from the drying gas in the condenser (300) or bypassing the drying gas from the condenser (300) in the bypass duct (201),
(i) removing vapor and non-condensable gases from the drying loop time- and electric-magnetic-controlled relief valve bleeder (204),
(j) guiding the drying gas through a honeycomb structure to provide a homogenous non-wavy gas flow near the wall,
(k) heating the homogenous non-wavy gas flow in the heater (206) to a temperature within an approximate range of 70° C.-140° C., and
(l) returning hot drying gas to the at least one drying chamber (108', 108").

20. The method of claim 19, wherein the drying gas is a hot superheated steam.

* * * * *